United States Patent [19]
Uri

[11] Patent Number: 5,628,278
[45] Date of Patent: May 13, 1997

[54] DRINKING WATER DISPENSER PARTICULARLY FOR POULTRY

[75] Inventor: Ehud Uri, Doar Na Menashe, Israel

[73] Assignee: Plasson Maagan Michael Industries Ltd., Doar Na Menashe, Israel

[21] Appl. No.: 389,478

[22] Filed: Feb. 16, 1995

Related U.S. Application Data

[63] Continuation-in-part of Ser. No. 961,810, Oct. 15, 1992, abandoned.

[51] Int. Cl.$^6$ ............................................ A01K 7/00
[52] U.S. Cl. ................................................ 119/72.5
[58] Field of Search ........................ 119/72, 72.5, 75; 137/614.18, 333, 339; 251/339, 357, 359

[56] References Cited

U.S. PATENT DOCUMENTS

| 1,772,588 | 8/1930 | Macrae . | |
|---|---|---|---|
| 2,594,968 | 4/1952 | Miller . | |
| 3,418,977 | 12/1968 | Godshalk . | |
| 3,477,471 | 11/1969 | Mallinson . | |
| 3,590,781 | 7/1971 | Spencer . | |
| 3,602,197 | 8/1971 | Fioretto | 119/72.5 |
| 3,669,077 | 6/1972 | Spierenburg | 119/72.5 |
| 3,750,628 | 8/1973 | Schumacher | 119/72.5 |
| 3,750,706 | 8/1973 | Mallinson . | |
| 3,756,199 | 9/1973 | Clark, IV | 119/72.5 |
| 4,258,666 | 3/1981 | Edstrom | 119/72.5 |
| 4,491,088 | 1/1985 | Hostetler . | |
| 4,790,264 | 12/1988 | Lack et al. | 119/72.5 |
| 5,074,250 | 12/1991 | Clark, IV | 119/72.5 |

FOREIGN PATENT DOCUMENTS 8804053  3/1988  Germany .

*Primary Examiner*—Thomas Price
*Attorney, Agent, or Firm*—Benjamin J. Barish

[57] ABSTRACT

A drinking water dispenser for animals for use in suspension-type water supply systems includes a pin received within a vertical bore in a housing and having a lower portion projecting downwardly through the bore, and an upper portion formed with an enlarged head, and overlying weight engageable with an upper portion of the pin, the enlarged head of the pin having a surface engageable with a surface of the housing around the bore. One or both of the latter surfaces are rounded such that the two surfaces define between them a valve which may be opened either by raising the pin or by tilting the pin. In addition, the weight is spaced from the upper portion of the enlarged head of the pin so as to be separated therefrom by a gap when the pin is not tilted or raised.

18 Claims, 3 Drawing Sheets

DRINKING WATER DISPENSER PARTICULARLY FOR POULTRY

RELATED APPLICATION

The present application is a continuation-in-part of application Ser. No. 07/961,810 filed Oct. 15, 1992 now abandoned.

FIELD AND BACKGROUND OF THE INVENTION

The present invention relates to drinking water dispensers for animals, particularly for poultry, for controlling the supply of water to poultry or other animals.

One type of water supply system in common use for dispensing water to poultry is the suspension-type system in which a plurality of poultry drinking devices are supported in suspension over the ground. Illustrative of such suspension-type systems is that described in U.S. Pat. No. 4,852,522 which is incorporated by reference as if fully set forth herein. A popular poultry drinking device used in such systems is a nipple-type device which includes a downwardly-extending pin or valve stem which releases a small quantity of water whenever the pin or valve stem is pushed upwardly by the poultry. Another nipple-type device releases a small quantity of water whenever the pin or valve stem is pushed upwardly or is tilted by the poultry. In certain nipple-type devices, a weight is disposed directly above and in contact with the pin to ensure that a certain threshold force must be exerted before any water is released. Examples of such poultry drinking devices are described in U.S. Pat. Nos. 1,772,588, 2,594,968, 3,418,977, 3,477,471, 3,483,847, 3,582,006, 3,590,781, 3,602,197, 3,648,663, 3,669,077, 3,750,706, 3,750,628, 3,756,199, 3,982,706, 4,258,666, 4,491,088, 4,610,063, 4,610,221, 4,649,866, 4,790,264, 5,074,250, British Patent 1,514,448 and German Utility Model G8804053.4.

Presently known nipple-type drinking devices suffer from a number of disadvantages: Thus, many nipple-type drinkers are activated only by pushing the pin directly upwardly which makes it more difficult and time-consuming for the poultry to activate the device. In addition, the amount of force needed to activate the device is approximately constant regardless of the degree to which the pin is displaced; and while it is possible for a fully mature hen to obtain an adequate supply of water, chicks and weaker poultry may be unable to exert enough force on the pin to overcome the threshold force required to activate the device to release water. Further, the location of the weight directly above, and in contact with, the pin can act to "freeze" the pin in a tilted position and prevent the pin from returning to its normal untilted position following displacement; this may cause the water to drip to the floor of the coop where it can lead to the growth of mildew or to other unhealthy consequences.

OBJECTS AND BRIEF SUMMARY OF THE INVENTION

An object of the invention is to provide a nipple-type poultry drinker, especially for use with suspension-type poultry drinking systems, which will be activated through the exertion of force in any of a number of directions even by small or weak poultry, and which will allow the flow of water to shut off completely when water is not needed.

According to the present invention, there is provided a drinking water dispenser for animals for use in suspension-type water supply systems, comprising: a housing formed with a vertically-extending bore through a part thereof; a pin received within said bore and having a lower portion projecting downwardly through said bore, and an upper portion formed with an enlarged head; and a weight located above and engageable with an upper portion of said pin; said enlarged head of the pin having a surface engageable with a surface of the housing around said bore to define a valve therewith. At least one of said surfaces is rounded such that the two surfaces define between them a valve which may be opened not only by raising the pin to lift its head off said housing surface, but also by tilting the pin to lift a part of its head off said housing surface. In addition, the weight is spaced from the upper portion of said enlarged head of the pin so as to be separated therefrom by a gap when the pin is not tilted or raised.

As will be more particularly shown below, a drinking water dispenser constructed in accordance with the foregoing features is specially suitable for suspension-type poultry water systems, which can be activated by displacing a pin in various directions, which enable young chicks to activate the device without exerting force large enough to lift a weight, and which at the same time ensure the proper shut-off of the device when not in use.

BRIEF DESCRIPTION OF THE DRAWINGS

The invention is herein described by way of example in the accompanying drawings, wherein.

DESCRIPTION OF PREFERRED EMBODIMENTS

Figure 1:
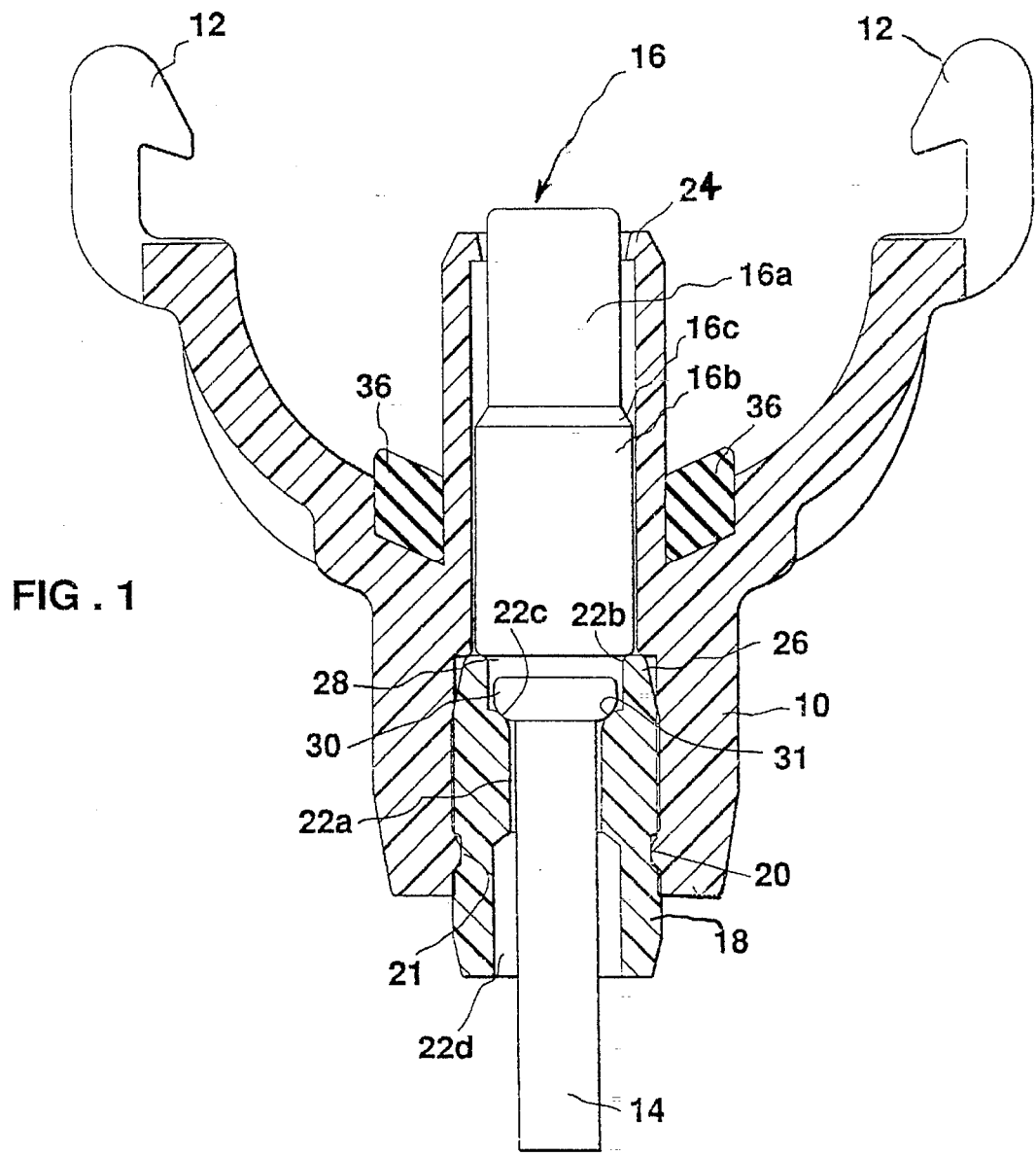
FIG. 1 is a cross-sectional view of a drinking water dispenser according to the present invention.
Figure 1A:
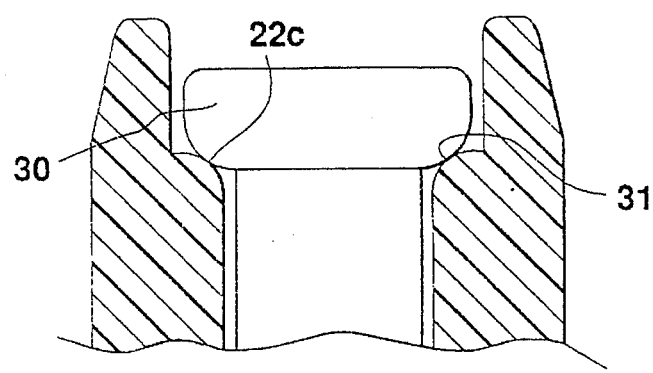
FIG. 1a is an enlarged fragmentary view of FIG. 1.
Figure 2:
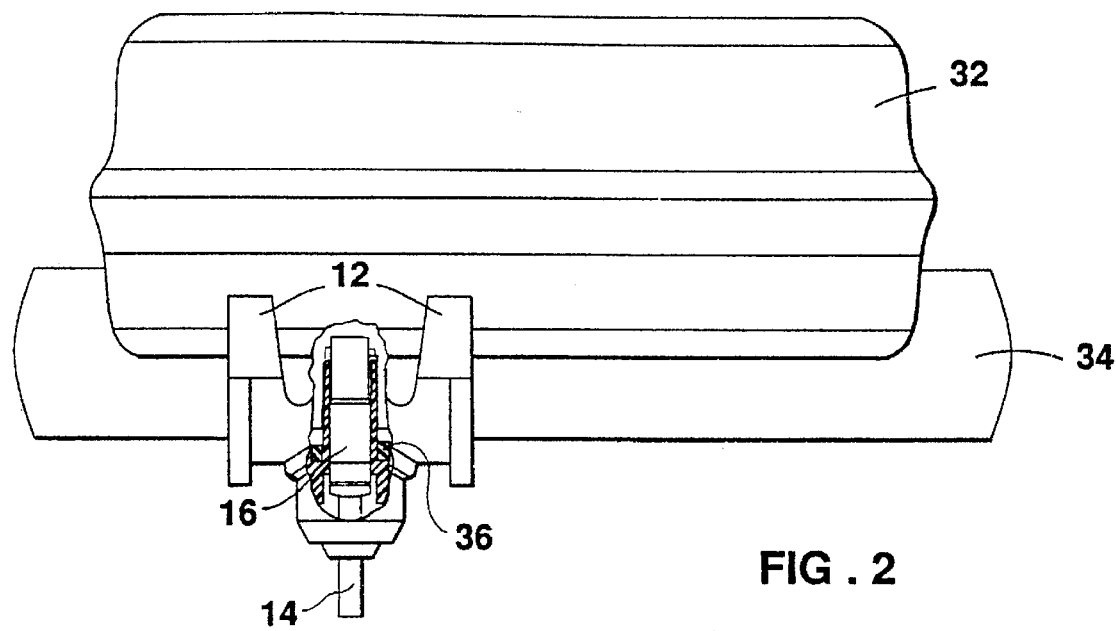
FIG. 2 is a side view (with partial cross-section) of the dispenser in FIG. 1 as it might be installed as part of a suspension-type poultry water supply system.
Figure 3:
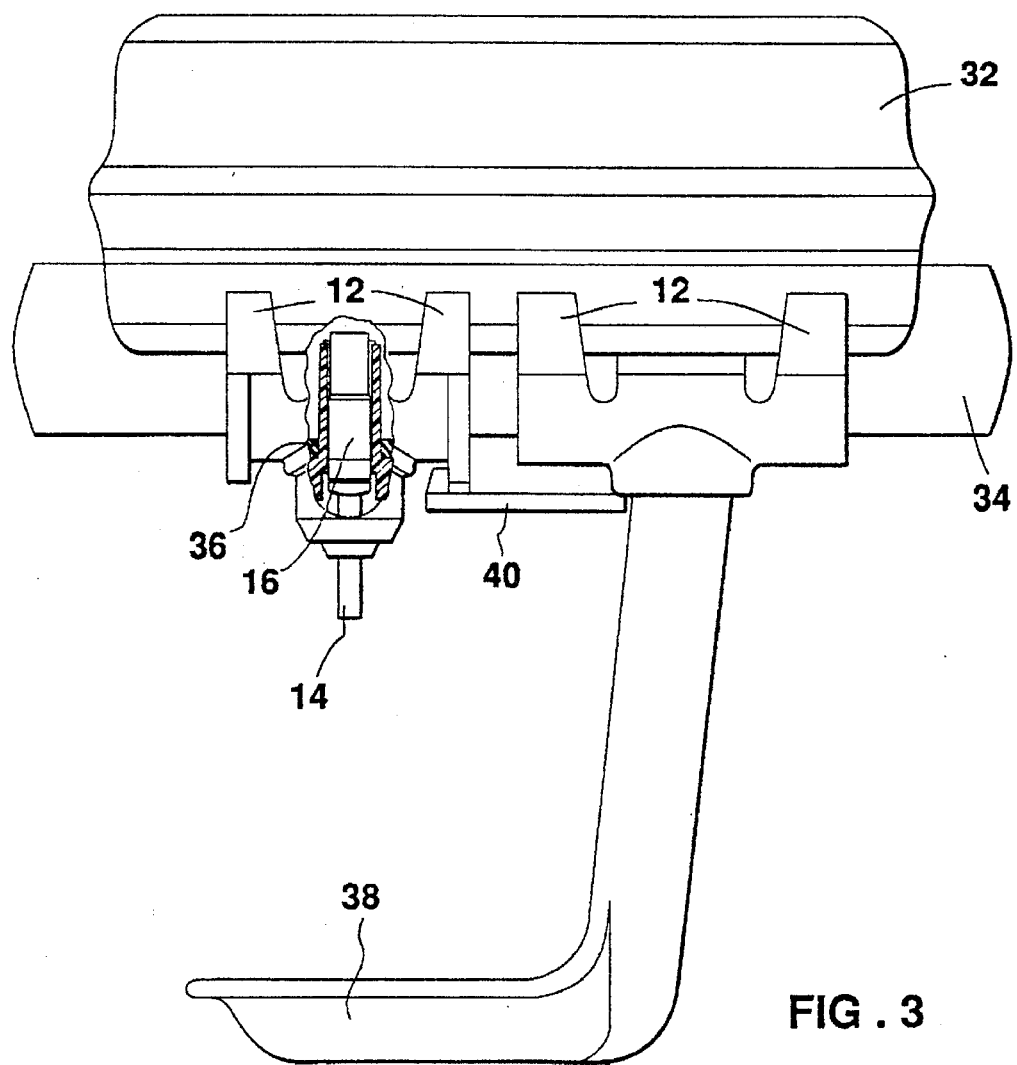
FIG. 3 is a side view (with partial cross-section) of the dispenser in FIG. 1 as it might be installed as part of a supsension-type poultry water supply system including a cup.

The dispenser illustrated in FIG. 1 includes a housing 10 which may be of any suitable size and dimensions and which may be made of any suitable material, but is preferably plastic. Housing 10 includes one or more pairs of clamps 12 which make it possible for the dispenser to be attached to a suspension-type poultry water supply system, as is shown in FIGS. 2 and 3 and as described in more detail below.

Held partly within housing 10 are two separate members, a pin 14 and a weight 16. These may be made of any suitable material but are preferably both made of metal, such as stainless steel. Weight 16 is located within a vertical bore 17 in housing 10. Pin 14 is located within an insert 18 received within the lower portion of housing bore 17 so as to constitute the lower part of the housing. For this purpose, housing 10 is formed with one or more protrusions 20, while insert 18 is formed with a bore 22 for receiving pin 18, and with matching depressions 24 for receiving the housing protrusions 20. To assemble the unit, insert 18, with pin 14 in its bore 22, is snapped into position within housing 10 such that the upper end 26 of the insert engages the inner surace of the housing to define a gap 28 between weight 16 and pin 14.

Weight 16 preferably is cylindrical in shape and formed with a somewhat smaller diameter at its top portion 16a than at its bottom portion 16b. Weight 16 is slidable vertically within a bore housing 10. The size of housing bore 17 is sufficiently larger than the largest outside diameter of weight 16 as to enable water to flow in the annular space between the housing bore and the weight. An inwardly extending lip 29 formed at the upper end of housing bore 17 is engagable with the juncture 16c between the two portions 16a, 16b of weight 16 to prevent the weight from sliding upwards more than a given amount.

Bore 22 through insert 18 includes an intermediate section 22a of somewhat larger diameter than that of pin 14, an upper section 22b of substantially larger diameter than section 22a and joined thereto by a juncture 22c of an outwardly rounded, i.e., spherical, configuration, and a lower section 22d also of larger diameter than that of section 22a.

Pin 14 includes an enlarged head 30 located within section 22d of bore 22. The juncture 31 between the enlarged head 30 and the stem of pin 14 is of outwardly rounded, i.e., spherical, configuration and is engageable with the bore juncture 22c which, as described earlier, is also of outwardly rounded, spherical configuration.

In the normal position of the water dispenser, weight 16 rests on the upper end 26 of insert 18 forming the gap 28 between the lower surface of the weight and the upper surface of enlarged head 30 of the pin. The diameter of pin 14 is sufficiently smaller than the diameters of bore sections 22a and 22d in insert 18 such that the pin can be tilted from the vertical in all directions about its enlarged head 30.

When pin 14 is in its normal (neutral) position (as shown in FIG. 1), the spherical juncture 31 of the pin engages the spherical juncture 22c of the insert bore 22 around the complete circumference of the latter to define a valve therewith which is closed to thereby block the flow of water through bore 22. However, when pin 14 is tilted, and/or pushed upwardly, at least a portion of the spherical juncture 31 of the pin separates from the spherical juncture 22c of the insert 18 such that water flow takes place around the enlarged head 30 and down the outside surface of the pin 14.

The size of gap 28, and the permissible tilt of pin 14, are such that the pin may be tilted to dispense water from the dispenser without raising the weight. This is of great importance for at least two reasons.

First, the ability to operate the valve without lifting weight 16 makes it possible and convenient for relatively weak chicks to obtain water from the dispenser without having to exert the relatively large force, which may be beyond their ability, needed to lift weight 16. The presence of gap 28 between pin 14 and weight 16 makes it possible for pin 14 to be tilted so as to start the water flow without pin 14 touching and lifting weight 16. On the other hand, when a full-sized hen pushes pin 14 upwardly, pin 14 directly lifts weight 16 thereby increasing the force needed to push pin 14 upwardly.

Second, gap 28 better assures that pin 14 will return to its neutral position whenever the pin is not being raised or tilted by the drinking poultry. In its netural position, pin 14 shuts off the flow of water and thus prevents undesired leakage of water which would otherwise wet the floor of the coop and potentially lead to various adversee health consequences. The provision of the gap, together with the spherical surfaces 22c and 31, decreases the possibility that the weight will cause the pin to be "frozen" in a non-vertical position following tilting and release of the pin by the poultry.

FIGS. 2 and 3 illustrate examples of two applications of a dispenser according to the present invention in suspension-type water supply systems.

FIG. 2 illustrates the dispenser as mounted by its clamps 12 onto a suspension member 32 which partly surrounds a water pipe 34 through which water is supplied to the dispenser. The geometry of the dispenser and associated members is such that when the dispenser is clamped onto suspension member 32, the portion of housing 10 which partly surrounds weight 16 is located inside water pipe 34 and is in hydraulic communication with the water flow through pipe 34. A seal 36, such as an O-ring or a flat ring, is preferably used to prevent leakage of water from pipe 34 to the outside. When properly sealed, water can only escape pipe 34 through the annular space between weight 16 and the surrounding walls of housing 10 and only when the enlarged head 30 of pin 14 is either lifted or tilted.

FIG. 3 is similar to FIG. 2 but further includes a drinking cup 38 which serves to receive the water dispensed as described above for the poultry to drink, and also to catch any water which may drip from the dispenser. Cup 38 may be mounted to suspension member 32 using clamps 12, and the cup mechanism may include a connector 40 for engaging an adjoining dispenser so as to keep cup 38 properly placed bneath the dispenser.

The performance of a device according to the present invention may be enhanced by providing more than a single weight, with each pair of weights being separated by an additional gap. Such a design progressively increases in finite steps the amount of force needed to lift pin 14.

Figure 4:
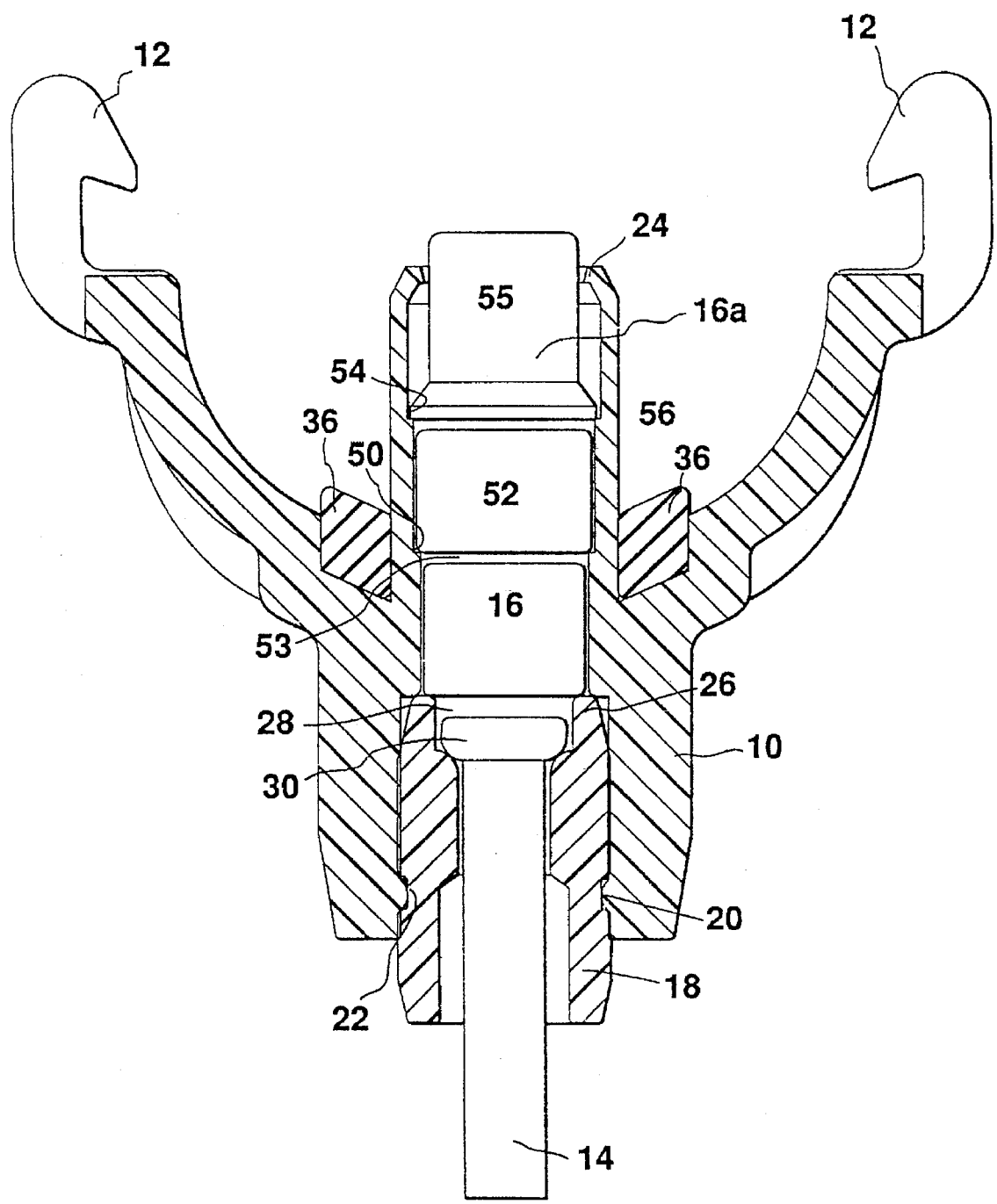
FIG. 4 is a cross-sectional view of another embodiment of a dispenser according to the present invention but including three weights.

An example of such a construction including three weights is shown in FIG. 4. Here, housing 10 is formed with a ledge 50 to support a second weight 52 over weight 16 and separated therefrom by gap 53. The housing 10 may be formed with a further ledge 54 to support a third weight 55 over weight 52 and separated therefrom by a further gap 56.

While the invention has been described with respect to several preferred embodiments, it will be appreciated that these are set forth merely for purposes of example, and that many other variations, modifications and applications of the invention may be made.

I claim:

1. A drinking water dispenser for animals for use in suspension-type water supply systems, comprising:

a housing formed with a vertically-extending bore through a part thereof;

a pin received within said bore and having a lower portion projecting downwardly through said bore, and an upper portion formed with an enlarged head;

and a weight located above, and engageable with, an upper portion of said pin;

said enlarged head of the pin having a surface engageable with a surface of the housing around said bore to define a valve therewith;

both of said surfaces being of rounded, outwardly-bulged configuration such that the two surfaces define between them a valve which may be opened either by raising the pin to lift its head off said housing surface, or by tilting the pin to lift a part of its head off said housing surface;

said weight being spaced from the upper portion of said enlarged head of the pin so as to be separated therefrom by a gap when the pin is not tilted or raised.

2. The dispenser according to claim 1, wherein both said engaging surfaces of the enlarged head and housing are of spherical configuration.

3. The dispenser according to claim 1, wherein said surface of the housing engageable by said surface of the enlarged head is defined by an insert removably attached to the housing and formed with a portion of said bore for receiving said pin.

4. The dispenser according to claim 3, wherein the upper end of said insert is spaced above the upper surface of said enlarged head to define a ledge engageable with the lower surface of the weight, and thereby to space the weight from said enlarged head to define said gap.

5. The dispenser according to claim 3, wherein the upper end of said bore formed in the insert is enlarged for receiving said enlarged head of the pin, and the lower end of said bore formed in the insert is enlarged for accommodating tilting movements of said pin.

6. The dispenser according to claim 1, wherein the upper end of said bore in the housing receiving said weight is formed with an inwardly-extending lip engageable with the weight for limiting the outward movement thereof with respect to said bore.

7. The dispenser according to claim 6, wherein said weight is formed with a lower portion of cylindrical configuration, and an upper portion also of cylindrical configuration but of smaller diameter than said lower portion and extending through said lip, said lip being engageable by the juncture between said upper and lower portions of the weight.

8. The dispenser according to claim 1, wherein said housing is formed with a ledge overlying and spaced from the upper end of said weight and receives a second weight overlying and spaced from said first-mentioned weight.

9. The dispenser according to claim 8, wherein said housing is formed with a second ledge overlying and spaced from the upper end of said second weight, and receives a third weight overlying and spaced from said second weight.

10. A drinking water dispenser for animals for use in suspension-type water supply systems, comprising:

a housing including a removable insert formed with a bore extending vertically when the dispenser is mounted in suspension;

a pin received within said bore and having a lower portion projecting downwardly through said bore, and an upper portion formed with an enlarged head;

and a weight located above, and engageable with, an upper portion of said pin;

said enlarged head of the pin having a surface engageable with a surface of the housing around said bore to define a valve therewith;

at least one of said surfaces being rounded such that the two surfaces define between them a valve which may be opened either by raising the pin to lift its head off said housing surface, or by tilting the pin to lift a part of its head off said housing surface;

said weight being spaced from the upper portion of said enlarged head of the pin so as to be separated therefrom by a gap when the pin is not tilted or raised;

the upper end of said insert being spaced from the upper surface of said enlarged head to define a ledge engageable with the lower surface of the weight, and thereby to space the weight from said enlarged head to define said gap;

said weight being formed with a lower portion of cylindrical configuration, and an upper portion also of cylindrical configuration but of smaller diameter than said lower portion and extending through said bore in the upper end of said housing;

said upper end of the housing being formed with an inwardly-extending lip engageable with the juncture between said upper and lower portions of the weight for limiting the outward movement of the weight with respect to said bore.

11. The dispenser according to claim 10, wherein both said engaging surfaces of the enlarged head and housing are of a rounded, outwardly-bulged configuration.

12. The dispenser according to claim 10, wherein the upper end of said insert bore is enlarged for receiving said enlarged head of the pin, and the lower end of said insert bore is enlarged for accommodating tilting movements of said pin.

13. The dispenser according to claim 10, wherein said housing is formed with a ledge overlying and spaced from the upper end of said weight and receives a second weight overlying and spaced from said first-mentioned weight.

14. The dispenser according to claim 13, wherein said housing is formed with a second ledge overlying and spaced from the upper end of said second weight, and receives a third weight overlying and spaced from said second weight.

15. A drinking water dispenser for animals for use in suspension-type water supply systems, comprising:

a housing formed with a vertically-extending bore through a part thereof;

a pin received within said bore and having a lower portion projecting downwardly through said bore, and an upper portion formed with an enlarged head;

and a weight located above, and engageable with, an upper portion of said pin;

said enlarged head of the pin having a surface engageable with a surface of the housing around said bore to define a valve therewith;

at least one of said surfaces being rounded such that the two surfaces define between them a valve which may be opened either by raising the pin to lift its head off said housing surface, or by tilting the pin to lift a part of its head off said housing surface;

said weight being spaced from the upper portion of said enlarged head of the pin so as to be separated therefrom by a gap when the pin is not tilted or raised;

said weight being formed with a lower portion of cylindrical configuration, and an upper portion also of cylindrical configuration but of smaller diameter than said lower portion and extending through said bore in the upper end of said housing; said upper end of the housing being formed with an inwardly-extending lip engageable with the juncture between said upper and lower portions of the weight for limiting the outward movement of the weight with respect to said bore.

16. The dispenser according to claim 15, wherein said surface of the housing engageable by said surface of the enlarged head is defined by an insert removably attached to the housing and formed with a portion of said bore for receiving said pin.

17. The dispenser according to claim 16, wherein the upper end of said insert is spaced above the upper surface of said enlarged head to define a ledge engageable with the lower surface of the weight, and thereby to space the weight from said enlarged head to define said gap.

18. The dispenser according to claim 15, wherein both said engaging surfaces of the enlarged head and housing are of a spherical configuration.

* * * * *